United States Patent [19]

Hill

[11] Patent Number: 4,463,810
[45] Date of Patent: Aug. 7, 1984

[54] PROCESS FOR FRACTURING SUBTERRANEAN FORMATIONS

[75] Inventor: Donald G. Hill, Tulsa County, Okla.

[73] Assignee: The Dow Chemical Company, Midland, Mich.

[21] Appl. No.: 304,747

[22] Filed: Sep. 23, 1981

[51] Int. Cl.$^3$ .......................................... E21B 43/267
[52] U.S. Cl. ................................ 166/308; 252/8.55 R
[58] Field of Search .................. 166/271, 281, 305 R, 166/308; 252/8.55 R, 8.55 D; 405/264

[56] References Cited

U.S. PATENT DOCUMENTS

| | | | |
|---|---|---|---|
| 3,023,162 | 2/1962 | Fordyce et al. | 210/734 |
| 3,888,312 | 6/1975 | Tiner et al. | 166/308 |
| 3,974,077 | 8/1976 | Free | 166/308 X |
| 4,012,327 | 3/1977 | Boothe et al. | 166/308 X |
| 4,033,415 | 7/1977 | Holtmyer et al. | 166/308 |
| 4,078,609 | 3/1978 | Pavlich | 166/308 X |
| 4,108,782 | 8/1978 | Thompson | 166/308 X |
| 4,115,339 | 9/1978 | Restaino | 526/303.1 X |
| 4,158,521 | 6/1979 | Anderson et al. | 405/264 |
| 4,237,974 | 12/1980 | Scherubel | 166/308 X |
| 4,366,071 | 12/1982 | McLaughlin et al. | 166/305 R X |
| 4,366,074 | 12/1982 | McLaughlin et al. | 166/305 R X |

FOREIGN PATENT DOCUMENTS 7708862 2/1978 Netherlands .

*Primary Examiner*—George A. Suchfield

[57] ABSTRACT

The process of initiating and/or extending a fracture in a subterranean formation penetrated by a wellbore which comprises injecting a crosslinked aqueous gelled fracturing fluid through the wellbore and against the formation at a flow rate and pressure sufficient to initiate and/or extend a fracture in the formation is improved by including in the fracturing fluid at least one compatible, water-soluble, aliphatic, cationic polymer bearing a plurality of pendant quaternary ammonium groups. Said pendant quaternary ammonium groups are separated from the polymer backbone by at least two carbon atoms and have an ethylene, —CH$_2$CH$_2$—, as one of the substituents chemically bonded to the nitrogen atom. As an example, a homopolymer of

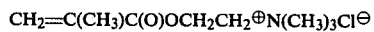

proved to be an excellent additive to a hydraulic fracturing fluid comprising an aqueous solution of hydroxypropylguar crosslinked with borate ions at a pH of from about 8.5 to 10.

22 Claims, No Drawings

PROCESS FOR FRACTURING SUBTERRANEAN FORMATIONS

BACKGROUND OF THE INVENTION

1. Field of the Invention

This invention pertains to the field of fracturing subterranean formations penetrated by a well bore. More particularly, this invention pertains to the fracturing of subterranean formations using an aqueous crosslinked gelled fracturing fluid containing certain cationic polymers which improves the overall effectiveness of the fracturing process.

2. Prior Art

Hydraulic fracturing is a well known process, as illustrated by the text "Hydraulic Fracturing" by G. C. Howard and C. R. Fast, Monograph Volume 2, Henry L. Doherty Series, Society of Petroleum Engineers of AIME, Dallas, Tex. (1970). This book provides an excellent, but somewhat dated, introduction into the field of hydraulic fracturing.

In a hydraulic fracture, an aqueous hydraulic fracturing fluid is injected through a wellbore against a formation at flow rates and pressures such that a fracture in the formation is initiated and/or extended. The hydraulic fracturing fluids are normally aqueous based fluids containing a polymeric gelling agent and a proppant (e.g. 20/40 mesh sand or bauxite). The gelled aqueous hydraulic fracturing fluids can be crosslinked or uncrosslinked. Most hydraulic fracturing fluids used today are aqueous solutions of guar or hydroxypropylguar crosslinked by borate anions or by certain polyvalent metal cations. The crosslinked fluids have better proppant-carrying capacity as well as better physical and chemical strength to withstand the rigors of temperature, pressure and shear imposed upon a fracturing fluid.

The purpose of hydraulic fracturing is, of course, to stimulate the production of subterranean fluids from the formation by providing permeable channels into the formation. Hydraulic fracturing has been used to stimulate the flow of water, oil and/or gas. This purpose can be defeated or the efficiency of the fracture diminished by the swelling of water-sensitive clays and/or the migration of clay fines and other minute particles in the formation. The problems associated with clays and/or fines in the treatment of wells is shown by the following (non-inclusive) listing of journal articles and patents: (1) SPE 4785 Hower (1974); (2) SPE 4786 Barkman et al. (1974); (3) SPE 5692 Haskin (1976); (4) SPE 6008 McLaughlin et al. (1976); (5) SPE 6009 Reed (1976); (6) SPE 6129 Stout et al. (1976); (7) SPE 6759 Copeland et al. (1977); SPE 7007 Muecke (1978); (8) SPE 7566 Thomas et al. (1978); (9) SPE 8795 Davies (1980); (10) SPE 8797 Williams et al. (1980); John E. Moore, *The Petroleum Engineer*, B-40 (February 1960); Carl D. Veley, Journal of Petroleum Technology, 1111 (September, 1969); H. C. McLaughlin et al., *World Oil*, 58 May 1977); John K. Borchardt et al., Paper No. 79-30-12 presented at the May meeting of the Petroleum Society of CIM (May 1979); Walter Rose, SPE-AIME Symposium (August, 1979).

Reference is also made to the following U.S. patents:

| | | |
|---|---|---|
| 3,108,069 | 3,382,924 | 3,349,032 |
| 3,537,524 | 3,603,399 | 3,610,338 |

-continued

| | | |
|---|---|---|
| 3,654,164 | 3,738,425 | 4,031,959 |

The above articles and patents generally set for the background and illustrate the problem associated with clays and fines in the treatment of wells.

Quaternary ammonium compounds have been used extensively to stabilize clays and prevent migration of fines. The quaternary ammonium compounds have been monomeric (e.g. ammonium chloride) or polymeric (e.g. U.S. Pat. No. 4,158,521 and German Offenlegungsschrift 27 36 277 (reference U.S. patent application Ser. No. 714,213 filed Aug. 13, 1976; and see U.S. patent application Ser. No. 901,664 filed May 4, 1978 both entitled "Oil Well Treating Method and Composition" by Homer C. McLaughlin et al.)). U.S. Pat. No. 4,158,521 teaches the use of the reaction product of dimethylamine and epichlorohydrin. The German Offen. teaches that a variety of polymeric quaternary ammonium or phosphonium compounds as well as a variety of polymeric sulfonium compounds can be used. The closest compounds to the present invention in the German Offen. is a methacrylate polymer having pendant ammonium groups separated from the ester oxygen by three carbon atoms. The German Offen. mentions fracturing only in the most casual sense.

SUMMARY OF THE INVENTION

The process of initiating and/or extending a fracture in a subterranean formation penetrated by a wellbore where the process comprises injecting a cross-linked aqueous gelled fracturing fluid (with or without proppant) through the wellbore and against the formation at a flow rate and pressure at least sufficient to initiate and/or extend a fracture in the formation is improved by including in said fracturing fluid at least one compatible, water-soluble, aliphatic, cationic, polymer bearing a plurality of pendant quaternary ammonium groups. The pendant quaternary ammonium groups are separated from the polymer backbone by at least two carbon atoms and have an ethylene group, $-CH_2CH_2-$, as one of the substituents chemically bonded to the nitrogen atom.

DETAILED DESCRIPTION OF THE INVENTION

The physical steps of injecting an aqueous hydraulic fracturing fluid into a well and pressurizing the well to initiate and/or extend a fracture are, of course, well known. The focus of the present invention is the use of aqueous hydraulic fracturing fluids containing certain polymers which give improved fracturing results by the stabilization of formation clays and reduction or elimination of the migration of clays and/or fines in the formation. This gives greater permeability and faster clean-up.

The primary components used in the aqueous hydraulic fracturing fluids are likewise well known classes of compounds. Such fracturing fluids have an aqueous media which has been thickened with a polymeric gelling agent and crosslinked with borate ions or with polyvalent metal ions.

The polymeric gelling agents are typically solvatable polysaccharides. This known class of compounds include a variety of natural gums as well as certain cellulosic derivatives which have been rendered hydratable by virtue of certain hydrophilic substituents placed upon the cellulose. Of these, the galactomannan gums and chemical derivatives thereof are the best known and most widely used. Examples of solvatable polysaccharides include, by way of illustration, locust bean gum, guar gum, and other galactomman gums, such as those from endosperms of seeds of other leguminous plants such as the sennas, Brazilwood, Tera, Honey Locust, Karaya gum, and the like. Other examples of solvatable polysaccharides include derivatives of such gums, such as hydroxyethylguar hydroxypropylguar, carboxyethylhydroxyethylguar, carboxymethylhydroxypropyl guar, and the like. Guar and hydroxypropylguar are the solvatable polysaccharides of choice based upon commercial availability and performance. Hydroxypropylguar is the most preferred material. While individual polysaccharides have been named, it is apparent that mixtures of solvatable polysaccharides could also be used if desired; usually, however, a single polymeric gelling agent is used.

In formulating the hydraulic fracturing fluid, the solvatable polysaccharides are normally blended with water or an aqueous medium (e.g. aqueous methanol or ethanol) to form an uncrosslinked gel as a first step. Like any chemical reaction, the rate of solvation of the particular polysaccharide will vary with the particular polysaccharide chosen. The skilled artisan recognizes this and therefore will recognize the advantage of pre-blending the polysaccharide with the particular solvent medium to obtain a smooth uniform gel before blending in the crosslinker and other additives. It should be noted at this point that the uncrosslinked gel containing the polymeric quaternary ammonium compounds hereafter named can be used as a pad fluid in the fracturing process. As used herein, a "gel" is a mixture which is homogenous or substantially homogenous down to substantially colloidal dimensions and capable of resisting a finite shearing force; such resistance to shearing is usually evidenced by viscosity measurements.

The amount of solvatable polysaccharide that is used in making the gel can vary. Usually only a small amount of solvatable polysaccharide is required because of the high efficiency that such polysaccharide display in thickening aqueous media. For most applications, satisfactory gels are made by adding the solvatable polysaccharide in amounts up to about 5 weight percent; based upon the weight of the aqueous liquid. Preferred amounts of polymer range from about 0.3 to about 3 weight percent.

The aqueous media is usually water or water/alcohol mixtures. The aqueous media can, of course, contain other additives which increase the rate of solvation of the polymer or perform some other desirable function. For example, the aqueous media can contain acids or bases to adjust the pH, pH buffering agents, iron control agents (e.g. chelating agents, such as the sodium or ammonium salts of ethylenediaminetetraacetic acid), surfactants, etc. Such additives may be added to the aqueous media before the polymeric gelling agent is added, but generally are added to the aqeuous gel after the polysaccharide is solvated.

The crosslinkers used to crosslink such solvatable polysaccharides or hydraulic fracturing fluids are likewise well known classes of compounds. The borate ion has been used extensively as a crosslinking agent for hydrated guar gums and other galactomannans. For example, Kern describes a crosslinking system in U.S. Pat. No. 3,058,909 which is used extensively in the oil and gas industry as a fracturing fluid. The borate system requires a basic pH (e.g. from about 8.5 to about 10) for crosslinking to occur in most instances. Free (U.S. Pat. No. 3,974,077) describes an "on-the-fly" approach for crosslinking such borate systems. Free describes a fracturing process which utilizes an aqueous fracturing fluid containing a galactomannan gum, a buffer which promotes an initial acidic pH in the fluid, a borate ion releasing compound, and a compound which functions to shift the pH of the fluid to the basic side after a short period of time. The later compound is added as the fracturing fluid is being pumped into the wellbore and crosslinking occurs as the fluid is flowing through the well enroute to the formation. The techniques used by Free generally are thought to represent the state of the art and are preferred.

Other crosslinking agents were developed using certain transition metals. Chrisp describes certain of these crosslinking systems in U.S. Pat. Nos. 3,202,556 and 3,301,723. In U.S. Pat. No. 3,202,556, aqueous solutions of galactomannan gums were crosslinked at a pH of from about 6 to 13 with crosslinking agents selected from the group consisting of compounds of antimony and bismuth. In U.S. Pat. No. 3,301,723 Chrisp described the use of certain titanium, zirconium, and other transistion metals as crosslinking agents or galactomannan gums at a pH also in the range of from about 6 to about 13. In both Chrisp patents, a basic pH was used to prepare crosslinked materials having utility in the explosive industry.

Another patent which describes the use of titanium crosslinkers for solvatable polysaccharides is Tiner et al. (U.S. Pat. No. 3,888,312). The crosslinked gels formed by Tiner were said to be useful as fracturing fluids. The use of such crosslinked gels was alleged to overcome the high friction loss experienced during the pumping of many high viscosity fracturing fluids previously known. This observation corroborates the disclosure by Chrisp in U.S. Pat. No. 3,301,723 in column 10 where Chrisp states that crosslinked gels formed using titanium, chromium, iron and zirconium crosslinkers result in gels which have a high surface tension (i.e. stickiness and tackiness are absent), ready workability, and other desirable physical characteristics.

Chrisp and Tiner et al. each describe titanium crosslinkers in which the "amine" portion of the crosslinker is a residue of triethanolamine. Such titantium compounds are commercially available and are preferred titanium crosslinkers. Preferred crosslinkers are borate ions, and polyvalent ions of titanium, zirconium, chromium or iron. Of these, the borate crosslinker is preferred at a basic pH whereas salts of titanium and zirconium having the transition in the plus 4 oxidation state are preferred if the pH is to be varied over a substantial pH range. The disclosures of Kern, Free, Chrisp, and Tiner et al. are specifically included herein by reference.

The polymeric additives to the fracturing fluid which provide the improved results in the fracturing process are compatible, water-soluble, aliphatic, cationic, polymers bearing a plurality of pendant quaternary ammonium groups. The pendant quaternary ammonium groups are separated from the polymer background by at least two carbon atoms and have an ethylene group, —$CH_2CH_2$—, as one of the substituents chemically bonded to the nitrogen atom. This is a known class of compounds having many members, most of which are vinyl addition polymers prepared by solution or emulsion polymerization techniques. Many members of this class include homopolymers or interpolymers of monomers corresponding to the formula:

wherein: R is hydrogen or methyl; X is O or NH; $R_1, R_2, R_3$ are each independently lower alkyl of from one to about 4 carbon atoms, and A is a compatible anion. Examples of such monomers are those of Formula I having the variables shown in Table 1 below:

TABLE I

| R | X | $R_1$ | $R_2$ | $R_3$ | $A^{\ominus}$ |
|---|---|---|---|---|---|
| H | O | $CH_3$ | $CH_3$ | $CH_3$ | Cl |
| H | NH | $CH_3$ | $CH_3$ | $CH_3$ | Cl |
| $CH_3$ | O | $CH_3$ | $CH_3$ | $CH_3$ | $CH_3SO_4$ |
| $CH_3$ | O | $CH_3$ | $CH_3$ | $C_3H_7$ | Br |
| H | NH | $C_2H_5$ | $CH_3$ | $C_2H_5$ | Cl |
| $CH_3$ | O | $C_4H_9$ | $CH_3$ | $CH_3$ | $CH_3SO_4$ |

The compounds illustrated in Table 1 are merely illustrative and other examples will be readily apparent to the skilled artisan. Preferred polymers for use herein are those homopolymers or interpolymers containing monomers of I; and of these, those polymers in which X is oxygen (O), and R is methyl, and $R_1R_2R_3$ are each methyl are most preferred. Cationic interpolymers of (meth)acrylamides and (meth)acrylates of Formula I are likewise operable. These polymers and methods of preparing same are described, for example, in U.S. Pat. No. 3,480,541; U.S. Pat. No. 3,336,269; U.S. Pat. No. 4,115,339; Belgium Pat. No. 867009; Japanese Pat. No. 50127989; Japanese Pat. No. 79000469; Dutch Pat. No. 154524; British Pat. No. 1,485,753; Japanese Pat. No. 51123289; and German Pat. No. 2557451; and the like. As many of these patents illustrate, the polymers can be formed from monomers containing the quaternized nitrogen atom per se or can be formed by polymerizing an aminoethyl (meth)acrylate or (meth)acrylamide and subsequently quaternizing the nitrogen atom with an appropriate alkylating reagent (e.g. methyl chloride or dimethylsulfate). The polymerization process technology for preparing such polymers is well established.

A homopolymer of I in which R is methyl, X is O, $R_1R_2R_3$ are each methyl, and A is chloro or methylsulfate is the most preferred polymer for use in the present invention.

The quaternary ammonium polymers are included in the fracturing fluid by merely blending such water soluble polymers into the aqeuous fracturing fluid prior to the addition of the crosslinking agent.

As noted above, a wide variety of additives can be included into the hydraulic fracturing fluid (e.g. alcohols, surfactants, etc.) and generally are included. Other additives which are most common include proppants (e.g. 20/40 mesh sand or bauxite) friction reducers (e.g. polyacrylamides), breakers (e.g. oxidizing agents), gases (e.g. carbon dioxide or nitrogen, generally nitrogen), diesel oil, etc. All of this is known to the skilled artisan. Such well known additives can likewise be included in the fracturing fluids of the present invention.

In the fracturing process, an aqueous pad fluid is normally introduced into the wellbore prior to the aqeuous crosslinked gelled fracturing fluid containing the proppant. The present class of polymeric quaternary ammonium compounds are advantageously included in both the pad fluid as well as the crosslinked fracturing fluid.

The following examples will further illustrate the invention.

PREPARATION OF BASE FLUID

A gel was formulated by blending hydroxypropylguar (HPG) with water containing 1 weight percent KCl to give a solution containing 40 pounds (lbs) of (HPG) per 1000 gallons (gal) of formulation, hereafter referred to as "the base fluid."

EXPERIMENT 1

A fracturing fluid was prepared by blending into an aliquot of the base fluid an ammonium persulfate breaker (1 lb/1000 gal), a minor amount of a surfactant (Dowell F75N), a bactericide (Dowell M76), and an antifoamer (Dowell D47), boric acid (3 lbs/1000 gal), and 2 gal of a water/methanol solution having 18 weight percent of a homopolymer of

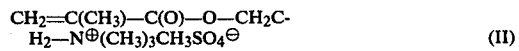

The formulated fluid was subsequently crosslinked by adjusting the pH to about 8.5 to about 10 with aqueous sodium hydroxide. The fluid crosslinked essentially instantaneously. The crosslinked fluid was a pumpable, stable fluid which had excellent viscosity and proppant-carrying capabilities which this borate-crosslinked fluid would normally be used at lower temperatures (e.g. up to about 225° F.).

EXPERIMENT 2

Another crosslinked fracturing fluid was prepared by blending the base fluid with the bactericide, surfactant, breaker and a commercial stabilizer (10 lbs/1000 gal; Dowell J353), and 2 gal/1000 of the water/methanol solution of the homopolymer of II. The pH was adjusted to 8.5 to 9.5 with base and the formulation subsequently crosslinked by adding a titanium (+4) triethanolamine compound (about 0.6 gal/1000 gal; DuPont Tyzor TE). The crosslinked fluid was pumpable, had excellent viscosity and proppant carrying capacity, and represented a superior fracturing fluid for higher temperature use (e.g. 225° to 325° F.).

The fracturing fluids shown by Experiments 1 and 2 are useful in fracturing subterranean formations by conventional fracturing techniques.

For example, the fracturing fluid of Experiment 1 at a neutral pH (i.e. prior to adding the base) is uncrosslinked. This uncrosslinked fluid was injected at 900 psig as a pad fluid in fracturing a well in Kingfisher County, Okla. When breakdown was observed, subsequent fluid was blended with 20/40 mesh sand (2400 lbs) and crosslinked on-the-fly according to the Free techniques. A total of 20,000 gal of fluid was pumped. The well was returned to production with good results. The formation clays appeared to be stabilized and migration of clays and/or fines in the formation was minimized.

Similar excellent results were achieved by using the fracturing fluid from Experiment 2 instead of the borate-crosslinked fluid in a substantially similar manner (i.e. uncrosslinked fluid pumped as a pad followed by the crosslinked, proppant-bearing fracturing fluid) in wells having a temperature up to about 352° F. (vs. about 150° F. for the well in Kingfisher County).

The fracturing fluids from experiments 1 and 2 had excellent properties in terms of break times and the broken fluids had essentially the same viscosity as water.

COMPARISON

The polymers of the present invention have substantial advantages over previous materials. For example, the epichlorohydrin/dimethylamine polymers from U.S. Pat. No. 4,158,521 (Anderson et al.) caused premature "breaks" when used in the above borate-crosslinked fracturing fluid formulations instead of the present polymers. I.e. the gel structure of the polymer broke and the fluid viscosity (and proppant-carrying capacity) was substantially reduced. The polymers of U.S. Pat. No. 4,158,521 were totally incompatible with the titanium crosslinked fluid.

What is claimed is:

1. In the process of initiating and/or extending a fracture in a subterranean formation penetrated by a wellbore comprising injecting a crosslinked aqueous gelled fracturing fluid through the wellbore and against the formation at a flow rate and pressure at least sufficient to initiate and/or extend a fracture in the formation, the improvement comprising including in said fracturing fluid at least one compatible, water-soluble, aliphatic, cationic polymer bearing a plurality of pendant quaternary ammonium groups, said pendant quaternary ammonium groups being separated from the polymer backbone by at least two carbon atoms and having an ethylene group, —CH$_2$CH$_2$—, as one of the substituents chemically bonded to the nitrogen atom, and said cationic polymer containing in interpolymerized form a monomer of the formula:

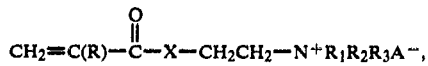

wherein: R is hydrogen or methyl; X is O or NH; R$_1$, R$_2$, and R$_3$ are each independently lower alkyl of from one to about four carbon atoms and A$^-$ is a compatible anion.

2. The process defined by claim 1 wherein said cationic polymer is a homopolymer of I.

3. The process defined by claim 2 wherein R is methyl.

4. The process defined by claim 2 wherein R is methyl and X is —O—.

5. The process defined by claim 2 wherein R is methyl; X is —O—; and R$_1$, R$_2$, and R$_3$ are each methyl.

6. The process defined by claim 2 wherein R is methyl; X is —O—; R$_1$, R$_2$, and R$_3$ are each methyl; and A$^-$ is chloro or bromo.

7. The process defined by claims 1, 2 or 6 wherein said fracturing fluid additionally comprises methanol, ethanol, isopropanol, sodium chloride, potassium chloride, and/or calcium chloride.

8. The process defined by claims 1 or 2 wherein said fracturing fluid comprises a galactomannan gum crosslinked with borate ions or a polyvalent metal ion.

9. The process defined by claim 8 wherein said galactomannan gum is crosslinked with a borate ion at a pH of about 8.5 to about 10.

10. The process defined by claim 8 wherein said galactomannan gum is crosslinked with a polyvalent metal ion of titanium, zirconium, iron, or chromium.

11. The process defined by claim 10 wherein said metal ion is titanium or zirconium ions in the +4 oxidation state.

12. The process defined by claim 8 wherein said galactomannan gum is guar or hydroxypropylguar.

13. The process defined by claim 8 wherein said aqueous crosslinked gelled fracturing fluid is crosslinked at a pH of from about 8.5 to about 10.

14. The process defined by claim 13 wherein said galactomannan gum is guar or hydroxypropylguar.

15. The process defined by claim 14 wherein said polyvalent metal ion is titanium or zirconium ions in the +4 oxidation state.

16. The process defined by claim 15 wherein said fracturing fluid additionally comprises methanol, ethanol, isopropanol, sodium chloride, potassium chloride, and/or calcium chloride.

17. The process defined by claim 1 wherein said fracturing fluid additionally comprises a particulate solid proppant.

18. The process defined by claim 1 wherein the pH of said aqueous crosslinked gelled fracturing fluid is from about 8.5 to about 10.

19. In the process of initiating and/or extending a fracture in a subterranean formation penetrated by a wellbore comprising injecting an aqueous gelled pad fluid followed by an aqueous crosslinked gelled fracturing fluid through the wellbore and against the formation at a flow rate and pressure at least sufficient to initiate and/or extend a fracture in the formation, the improvement comprising including in said pad fluid at least one compatible, water-soluble, aliphatic, cationic polymer bearing a plurality of pendant quaternary ammonium groups, said pendant quaternary ammonium groups being separated from the polymer backbone by at least two carbon atoms and having an ethylene group, —C$_2$CH$_2$—, as one of the substituents chemically bonded to the nitrogen atom, and said cationic polymer containing in interpolymerized form a monomer of the formula:

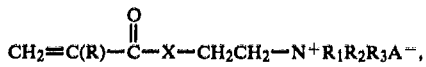

wherein: R is hydrogen or methyl; X is O or NH; R$_1$, R$_2$, and R$_3$ are each independently lower alkyl of from one to about four carbon atoms and A$^-$ is a compatible anion.

20. The process defined by claim 19 wherein the pH of said aqueous crosslinked gelled fracturing fluid is from about 8.5 to about 10.

21. The process defined by claim 19 wherein said pad fluid and said fracturing fluid each comprises a galactomannan gum, and wherein the galactomannan gum in said fracturing fluid is crosslinked at a pH of from about 8.5 to about 10 with borate ions or a polyvalent metal ion.

22. The process defined by claim 21 wherein said galactomannan gum is guar or hydroxypropylguar and wherein said polyvalent metal ion is titanium or zirconium ions in the +4 oxidation state.

* * * * *